United States Patent [19]

Funaki et al.

[11] Patent Number: 5,708,795
[45] Date of Patent: Jan. 13, 1998

[54] ASYNCHRONOUS ACCESS SYSTEM FOR MULTIPROCESSOR SYSTEM AND PROCESSOR MODULE USED IN THE ASYNCHRONOUS ACCESS SYSTEM

[75] Inventors: Jun Funaki; Akira Kabemoto; Hirohide Sugahara, all of Kawasaki, Japan

[73] Assignee: Fujitsu Limited, Kawasaki, Japan

[21] Appl. No.: 188,774

[22] Filed: Jan. 31, 1994

[30] Foreign Application Priority Data

Mar. 18, 1993 [JP] Japan .................................. 5-059129

[51] Int. Cl.$^6$ .................................................. G06F 13/14
[52] U.S. Cl. .......................... 395/494; 395/474; 395/483
[58] Field of Search ............................ 395/476, 494, 395/474, 483

[56] References Cited

U.S. PATENT DOCUMENTS

| | | | |
|---|---|---|---|
| 4,885,680 | 12/1989 | Anthony et al. | 395/471 |
| 5,010,477 | 4/1991 | Omoda et al. | 364/200 |
| 5,129,093 | 7/1992 | Muramatsu et al. | 395/800 |
| 5,214,775 | 5/1993 | Yabushita et al. | 395/444 |
| 5,218,680 | 6/1993 | Farrell et al. | 395/200.06 |
| 5,287,473 | 2/1994 | Mohan et al. | 395/460 |
| 5,297,260 | 3/1994 | Kametani | 395/800 |
| 5,353,416 | 10/1994 | Olson | 395/325 |
| 5,371,896 | 12/1994 | Gove et al. | 395/650 |

*Primary Examiner*—Tod R. Swann
*Attorney, Agent, or Firm*—Staas & Halsey

[57] ABSTRACT

In an asynchronous access system for a multiprocessor system having a plurality of processor modules connected to a system bus and at least one shared memory module connected to the system bus, each of the processor modules includes a processor and an internal buffer. The processor writes data into the internal buffer, and the data is read from the internal buffer and is written into the shared memory via the system bus. The asynchronous access system includes a first unit, provided in each of the processor modules, for detecting a predetermined situation regarding a data write from the processor to the shared memory, and a second unit, provided in each of the processor modules, for causing the data stored in the internal buffer to be written into the shared memory module when the first unit detects the predetermined situation.

15 Claims, 9 Drawing Sheets

ASYNCHRONOUS ACCESS SYSTEM FOR MULTIPROCESSOR SYSTEM AND PROCESSOR MODULE USED IN THE ASYNCHRONOUS ACCESS SYSTEM

BACKGROUND OF THE INVENTION

1. Field of the Invention

The present invention relates to an asynchronous access system for a multiprocessor system in which a plurality of processor modules and a shared memory are connected together via a system bus.

2. Description of the Prior Art

In a conventional multiprocessor system, a processing unit in each processor employs a synchronous access system in which a space in a shared memory module, present in its own physical address area, is directly accessed via a system bus by a physical address. However, it takes a long time to access the shared memory module using the system bus of the processor modules according to the synchronous access system, as compared with an access to a main memory provided in each processor module.

With the above in mind, internal buffers for connecting the system bus and the processor modules are provided in order to speed up access to the shared memory module and reduce overhead of the system bus. When a central processing unit (hereinafter, simply referred to as a processing unit) recognizes a write instruction addressed to the shared memory module, write data stores into the corresponding internal buffer and immediately reply to the processing unit. The processing unit continuously writes next write data into the internal buffer. In this manner, data equal to one block, consisting of a predetermined number of words including the write area for the processing unit, is written into the shared memory module by block writing. With the above structure, it becomes possible to reduce the overhead of the system bus and realize high-speed writing of data into the shared memory module by the processing units.

Conventionally, the block writing of data into the shared memory module from the internal buffers of the connection units is carried out by issuing kick-off instructions, which instruct start of data transfers from the internal buffers to the shared memory module. Hence, software in each of the processor modules must issue kick-off instructions in a suitable processing unit, so that overhead is needed.

If software does not issue the kick-off instruction for a long time, the latest contents of the shared memory will be reserved in the related buffer, and the contents of the shared memory modules of some processors will not match each other. If data in which a mismatch has occurred is used, the overall computer system may be destroyed.

SUMMARY OF THE INVENTION

It is a general object of the present invention to provide an asynchronous access system for a multiprocessor system and a multiprocessor module used in the multiprocessor system in which the above disadvantages are eliminated.

A more specific object of the present invention is to provide an asynchronous access system for a multiprocessor system and a multiprocessor module in which block write is carried out without any kick-off instruction from a central processing unit, to thereby reduce the overhead of the central processing unit and prevent a mismatch of the contents of a shared memory module between processors.

The above objects of the present invention are achieved by an asynchronous access system for a multiprocessor system having a plurality of processor modules connected to a system bus and at least one shared memory module connected to the system bus, each of the processor modules including a processor and an internal buffer, the processor writing data into the internal buffer, the data being read from the internal buffer and being written into the shared memory module via the system bus, the asynchronous access system further comprises first means, provided in each of the processor modules, for detecting a predetermined situation regarding a data write from the processor to the shared memory module and second means, provided in each of the processor modules, for causing the data stored in the internal buffer to be written into the shared memory module when the first means detects the predetermined situation.

The above objects of the present invention are also achieved by a processor module connected to a system bus of a multiprocessor system having processor connected to the system bus and at least one shared memory module connected to the system bus, the processor unit module including a processor and an internal buffer, the processor unit writing data into the internal buffer, the data being read from the internal buffer and being written into the shared memory module via the system bus. The processor module further comprises first means for detecting a predetermined situation regarding a data write from the processor to the shared memory module and second means for causing the data stored in the internal buffer to be written into the shared memory module when the first means detects the predetermined situation.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 1:
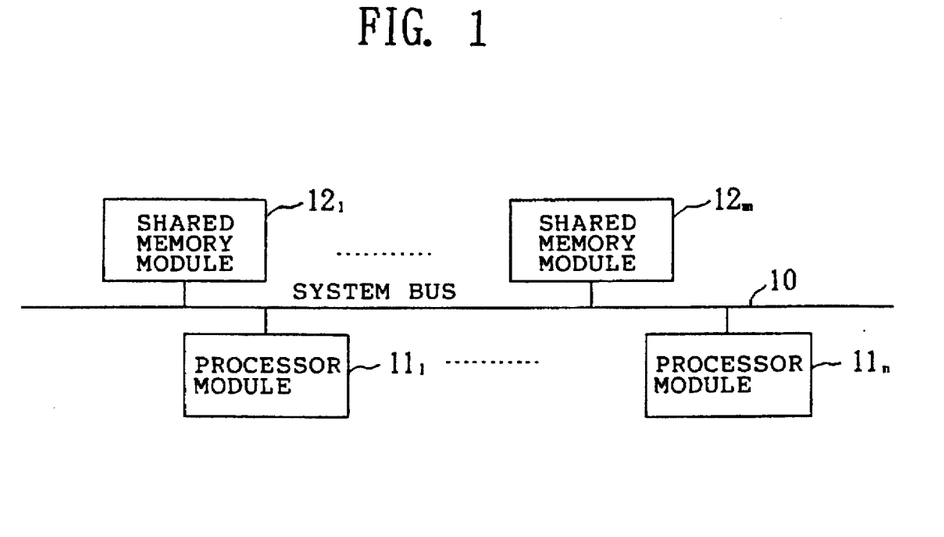
FIG. 1 is a block diagram of a multiprocessor system according to an embodiment of the present invention.

FIG. 1 is a block diagram of a multiprocessor system to which an embodiment of the present invention is applied. The multiprocessor system shown in FIG. 1 includes processor modules $11_1$ through $11_n$ (n is an integer) connected to a system bus 10, and shared memory modules $12_1$ through $12_m$ (m is an integer) connected to the system bus 10.

Figure 2A:
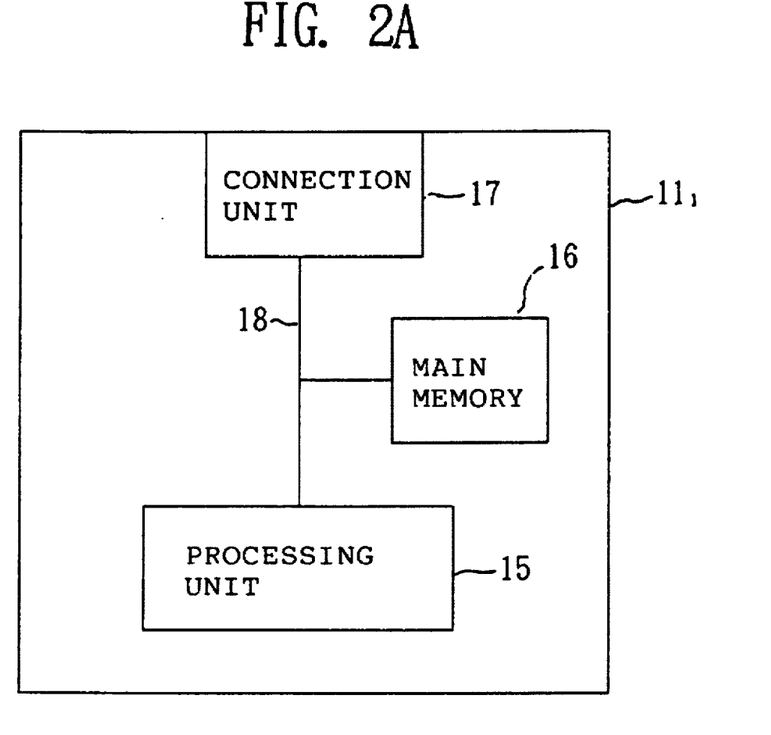
FIG. 2A is a block diagram of a processor module used in the system shown in FIG. 1.
Figure 2B:
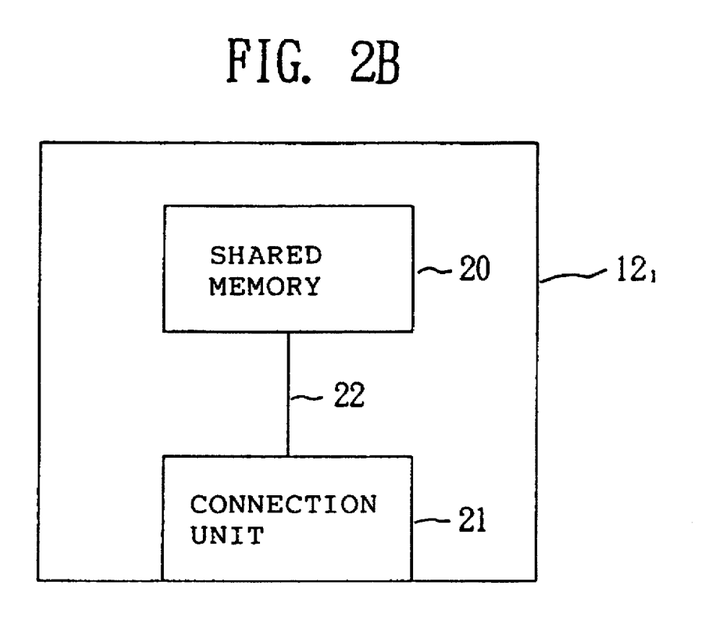
FIG. 2B is a block diagram of a shared memory module used in the system shown in FIG. 1.

As shown in FIG. 2A, each of the processor modules $11_1$ through $11_n$ comprises a central processing unit (hereinafter referred to as a processing unit) 15, a main memory 16 and a connection unit 17 connected to the system bus 10. The processing unit 15, the main memory 16 and the connection unit 17 are connected together via an internal bus 18. As shown in FIG. 2B, each of the shared memory modules $12_1$ through $12_n$ comprises a shared memory 20, a connection unit 21 and an internal bus 22 connecting the shared memory 20 and the connection unit 21 together.

Figure 3:
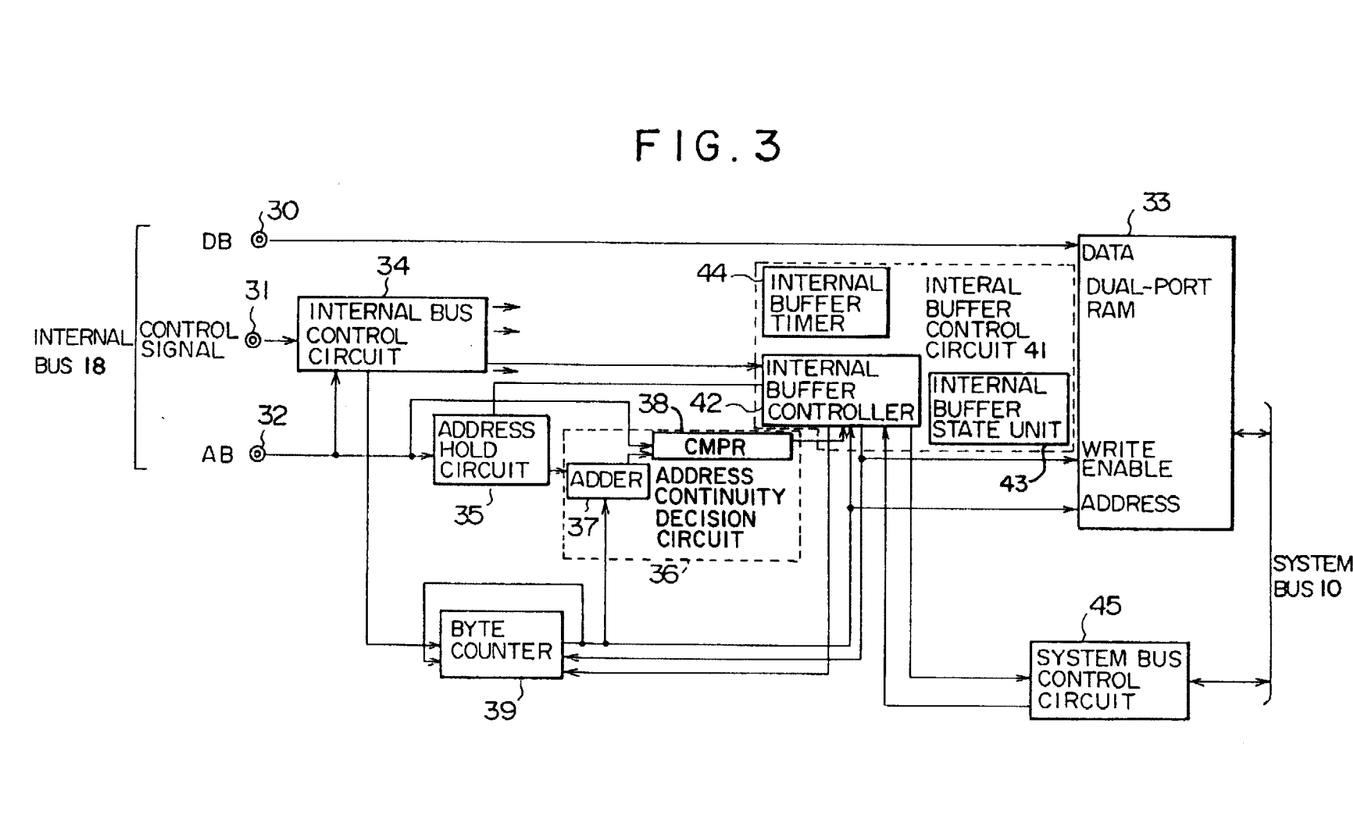
FIG. 3 is a block diagram of a connection unit provided in each processor module shown in FIG. 1.

FIG. 3 is a block diagram of the connection unit 17 shown in FIG. 2A. Terminals 30, 31 and 32 are connected to the internal bus 18. A data signal incoming to the unit 17 from, for example, the processing unit 15 (FIG. 2A) via the terminal 30, is supplied to a dual-port RAM 33, which functions as an internal buffer. A control signal incoming from the processing unit 15 via the terminal 31 is supplied to an internal bus control circuit 34. An address signal incoming from the processing unit 15 via the terminal 32 is supplied to the internal bus control circuit 34, an address hold circuit 35, and an address continuity decision circuit 36.

The RAM 33 and a system bus control circuit 45 are connected to the system bus 10. Data, for example data equal to one block consisting of 16 bytes, is stored in the RAM 33.

The internal bus control circuit 34 supplies the control signal from the processing unit 15 to an internal buffer control circuit 41 and to other parts. The address hold circuit 35 holds the access address of the shared memory module received via the terminal 32 when a hold instruction signal from an internal buffer control circuit 42 (which will be described later) within the internal buffer control circuit 41 is supplied to the address hold circuit 35. Then, the circuit 35 outputs the held access address to an adder 37 in the address continuity decision circuit 36.

A byte counter 39 is reset to zero when a reset signal from the internal buffer circuit 42 is received, and is supplied with data indicating the number of write bytes from the internal bus control circuit 34 each time data from the processing unit 15 is written into the RAM 15. When a write enable signal with respect to the RAM 33 is supplied from the internal buffer controller 42, the byte counter 39 increments its count value by the above number of bytes, and the updated count value is sent to the adder 37.

The adder 37 of the address continuity decision circuit 36 adds the address from the address hold circuit 35 and the count value from the byte counter 39, and sends the added result to the comparator ("CMFR") 38. The comparator 38 compares the added result from the adder 37 with the access address of the shared memory module, supplied from the processing unit 15 via the terminal 32, and generates an address discontinuity signal indicative of "1" when the two addresses do not coincide with each other. The generated address discontinuity signal is supplied to the internal buffer controller 42.

The internal buffer control circuit 41 is made up of the internal buffer controller 42, an internal buffer state unit 43 and an internal buffer timer 44.

First, a description will be given in reference to FIG. 4, of an internal buffer state as indicated by the internal buffer state unit 43. A state A indicates that a new access is acceptable. A state B indicates a state in which an access to the shared memory module is started and ended. A state BS, contained in the state B, indicates a state in which the write operation on the shared memory is started and data is stored in the internal buffer. A state SS, contained in the state B, indicates a state in which the contents of the internal buffer are being written into the shared memory module. A state EP indicates a reservation resulting from an occurrence of an exception, in which the write operation on the shared memory access is terminated with an abnormality. A state PP indicates a reservation of a retry to perform the write operation on the shared memory module which has just failed.

Figure 4:
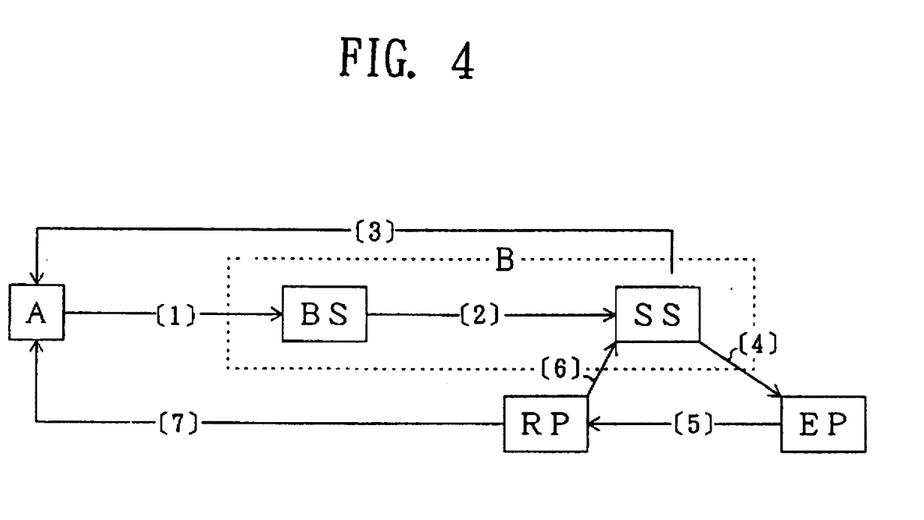
FIG. 4 is a diagram showing transitions of the state of an internal buffer.

The state of the internal buffer 33 is transferred under conditions [1] through [7] shown in FIG. 4.

Transition [1] occurs in response to acceptance of writing with respect to the shared memory module.

Transition [2] occurs in response to a plurality of transfers to write the contents of the internal buffer 33 into the shared memory module.

Transition [3] occurs when the writing operation on the shared memory module is normally ended.

Transition [4] occurs when the writing operation on the shared memory module is abnormally terminated.

Transition [5] occurs when a space in the shared memory module is accessed in the state EP, and a synchronous interrupt to the processing unit is generated.

Transition [6] occurs when the state of the internal buffer 33 is transferred to the SS state by accessing a space in the shared memory module in the state RP, so that the writing operation on the shared memory is retried.

Transition [7] occurs when the reserved retry is cancelled.

Figure 5:
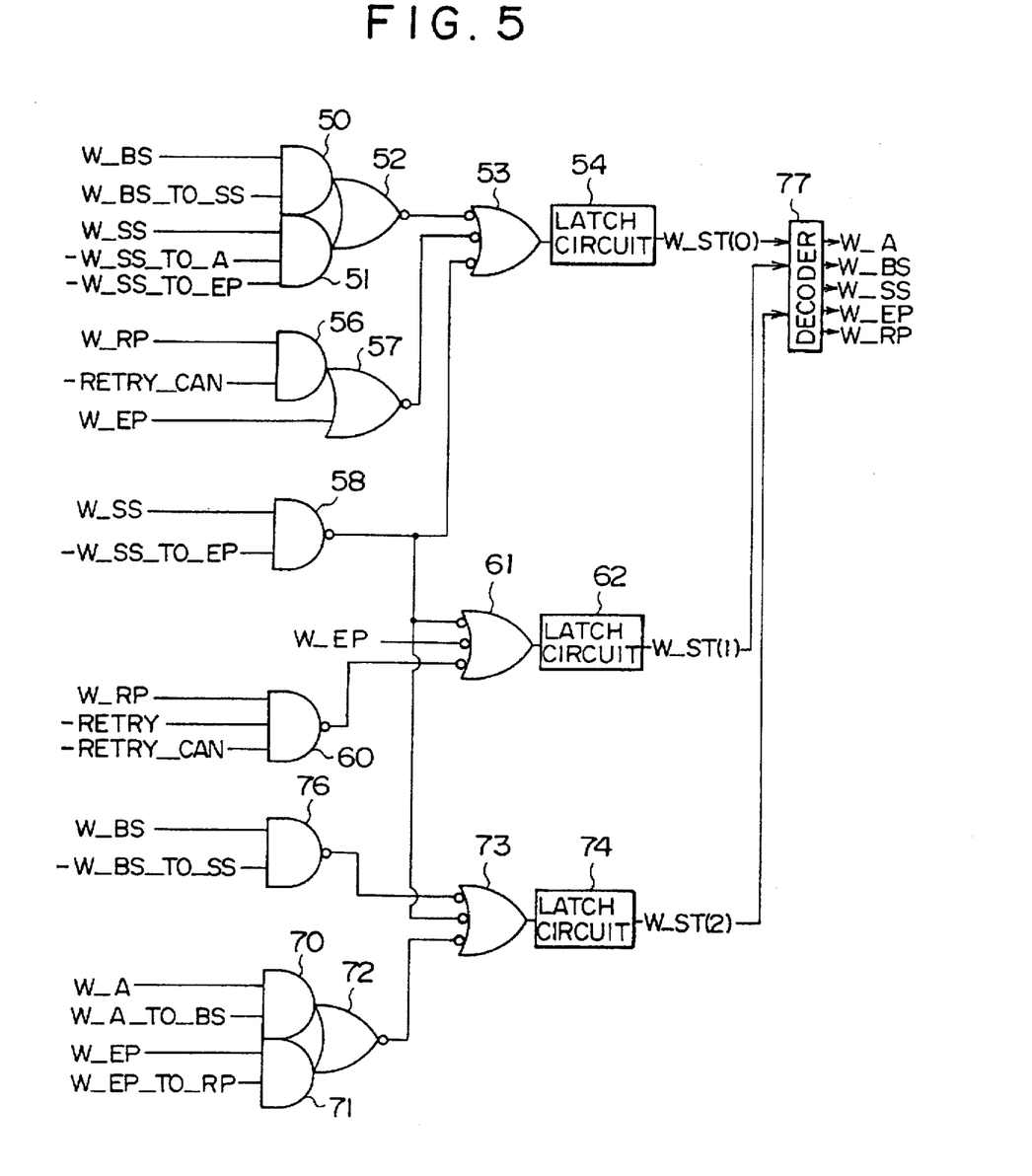
FIG. 5 is a circuit diagram of an internal buffer state unit shown in FIG. 3.

FIG. 5 is a circuit diagram of the internal buffer state unit 43. Each of the states is indicated by three bits. The states A, BS, SS, EP and RP are respectively indicated by "000" "001" "100" "111" and "110". Referring to FIG. 5, an AND circuit 50 receives a decoded signal W_BS, which has a value of "1" for indicating the state BS, and a signal W_BS_TO_SS, which assumes a value of "1" to indicate a transition from the state A to the state SS and is supplied from internal buffer controller 42. An AND circuit 51 receives a decoded signal W_SS, which assumes a value of "1" to indicate the state BS, an inverted version signal -X_SS_TO which assumes a value of "1" to indicate a transition from the state SS to the state A, and an inverted version -WX_SS_TO_EP of a signal which assumes a value of "1" to indicate a transition from the state SS to the state EP. A latch circuit 54 latches "1" via NOR circuits 52 and 53 when the output signal of either the AND circuit 50 or the AND circuit 51 indicates "1".

An AND circuit 56 receives a decoded signal W_RP, which assumes "1" in the state RP, and an inverted version -RETRY_CAN of a signal assuming "1" to indicate cancellation of writing of data into the shared memory module. When the output signal of the AND circuit 56 indicates "1" or the internal buffer 33 is in the state EP, the latch circuit 54 latches "1" via a NOR circuit 57 and the NOR circuit 53. A NAND circuit 58 receives the decoded signal W_SS assuming "1" in the state SS, and the inverted signal -WX_SS_TO_EP. The latch circuit 54 latches "1" via the NOR circuit 53 when the output signal of the NAND circuit 58 indicates "0". The latch circuit 54 latches the first bit (MSB: Most Significant Bit) W_ST(0) among the three bits indicating the state of the internal buffer 33.

A NAND circuit 60 is supplied with the decoded signal W_RP, the inverted version -RETRY of the signal assumes a value of "1" for indicating to indicate a retry of writing data into the shared memory module, and the above-mentioned inverted version -RETRY_CAN. When the output of either the NAND circuit 58 or a NAND circuit 60 indicates "0", or when an inverted version -W_EP of a decoded signal assuming "1" in the state EP, a latch circuit 62 latches "1" via a NOR circuit 61. The latch circuit 62 latches the second bit W_ST(1) among the three bits indicating the state of the internal buffer 33.

An AND circuit 70 receives a decoded signal W-A assuming a value of "1" to indicate the state A, and a signal W_BS_TO_SS assuming a value of "1" to indicate a transition from the internal state A to the state BS. An AND circuit 71 is supplied with a decoded signal W_EP assuming "1" to indicate the state EP, and a signal W_EP_TO_RP assuming "1" to indicate a transition from the state EP to the state RP. When the output signal of either the AND circuit 70 or the AND circuit 71 is "1" a latch circuit 74 latches "1" via NOR circuits 72 and 73. The NAND circuit 76 is supplied with the decoded signal W_BS assuming "1" in the state BS, and an inverted version -W_A_TO_, BS assuming "1" to indicate a transition from the state BS to the state SS. When the output signal of either an AND circuit 58 or an AND circuit 76 is "0" the latch circuit 74 latches "1" via the NOR circuit 73. The latch circuit 74 latches the third bit W_ST(2) (LSB: Least Significant Bit) among the three bits indicating the state of the internal buffer 33.

A decoder 77 decodes the bits W_ST(0), W_ST(1) and W_ST(2) respectively output from the latch circuits 54, 62 and 74, and generates decoded signals W_A, W_BS, W_SS, W_EP and W_RP.

Figure 6:
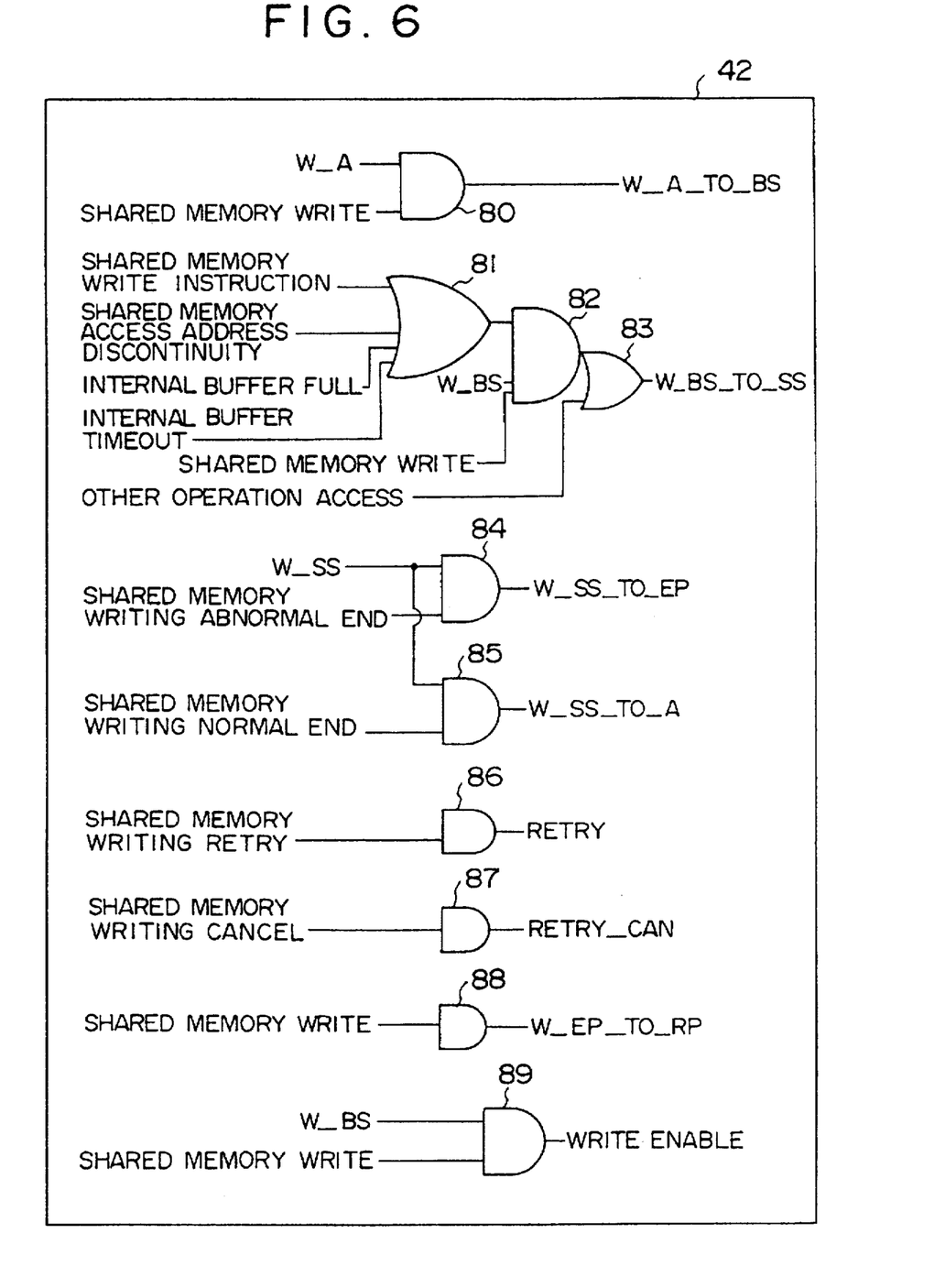
FIG. 6 is a circuit diagram of an internal buffer controller shown in FIG. 3.

FIG. 6 is a circuit diagram of the internal buffer controller 42. An AND circuit 80 generates a signal W_A TO_BS from the signal W_A from the internal buffer state unit 43, the signal assuming "1" to indicate write of data into the shared memory module. The signal W_A_TO_BS instructs resetting of the byte counter 39 and address holding of the address hold circuit 35.

An OR circuit 81 receives, from the internal bus control circuit 34, the signal assuming "1" to indicate the kick-off signal by which data from the internal buffer is forced to be written into the shared memory. The OR circuit 81 receives, from the comparator 38, the signal assuming "1" to indicate that the access address of the shared memory is discontinuous. The OR circuit 81 receives, from the byte counter 39, a signal assuming "1" to indicate that the internal buffer is full of data. The OR circuit 81 receives, from the internal buffer timer 44, a signal assuming "1" when a timeout has occurred in the internal buffer. The output signal of the OR circuit 81 is supplied to an AND circuit 82. The AND circuit 82 receives the signal W_BS, and receives from the internal bus control circuit 34, the signal assuming "1" to indicate write of data into the shared memory module. The AND circuit 82 outputs "1" when the input signals are all "1". The output signal of the AND circuit 82 and a signal from the internal bus control circuit 34, for example, assuming "1" to indicate an access to the shared memory module other than the write access, for example, a read access, are output via an OR circuit 83 as the signal W_BS_TO_SS. When the signal W_BS_TO_SS assumes a value of "1", this signal is supplied to the system bus control circuit 45 as a signal indicating block write.

An AND circuit 84 receives the signal W_SS, and receives, from the system bus control circuit 45, the signal assuming "1" to indicate the abnormality end of writing with respect to the shared memory module. Then, the AND circuit 84 generates the signal W_SS_TO_EP from the above input signals. An AND circuit 85 receives the signal W_SS, and receives, from the system bus control circuit 45, the signal assuming "1" to indicate the normal end of the write operation on the shared memory module. Then, the AND circuit 85 generates the signal W_SS_TO_A from the above input signals. A one-input AND circuit 86 outputs, as the signal RETRY, the signal received from the internal bus control circuit 34 and assuming "1" to indicate a retry to write data into the shared memory module. A one-input AND circuit 87 outputs, as the signal RETRY_CAN, the signal received from the internal bus control circuit 34 and assuming "1" to indicate cancellation of writing with respect to the shared memory module. An AND circuit 89 generates the write enable signal applied to the RAM 33 from the signal W_BS and the signal received from the internal bus control circuit 34 and assuming "1" to indicate writing with respect to the shared memory module.

Figure 7:
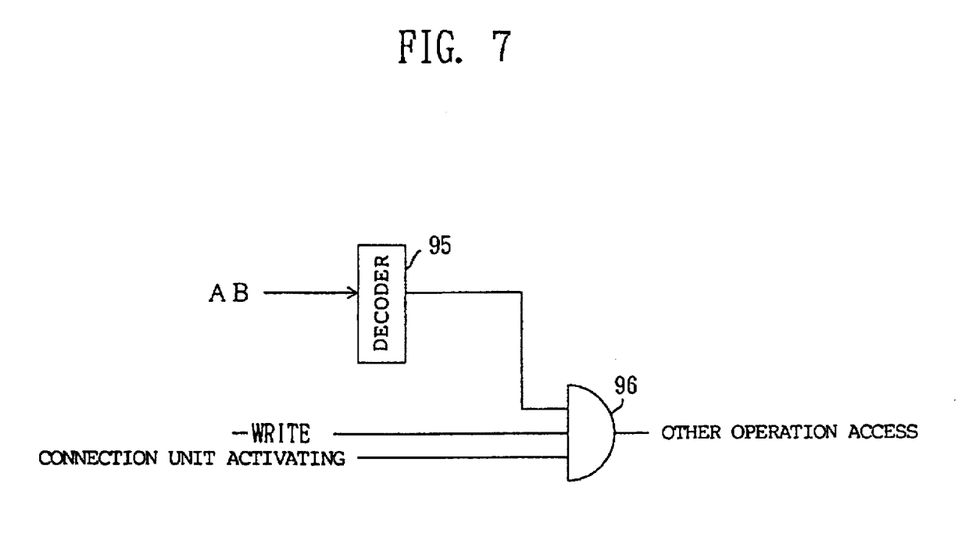
FIG. 7 is a circuit diagram of an internal buffer control circuit shown in FIG. 3.

An access to the shared memory module other than a write access thereto is detected by a circuit provided in the internal bus control circuit 34. A decoder 95 decodes an access address AB received via the terminal 32 (FIG. 3), and generates a signal assuming "1" when the received address indicates an access to the shared memory space. The generated signal is supplied to an AND circuit 96. The AND circuit 96 receives the control signal which is applied to the terminal 31 shown in FIG. 3 and which assumes "1" (CONNECTION UNIT ACTIVATING; FIG. 7) when the connection unit 17 should be activated.

Figure 8:
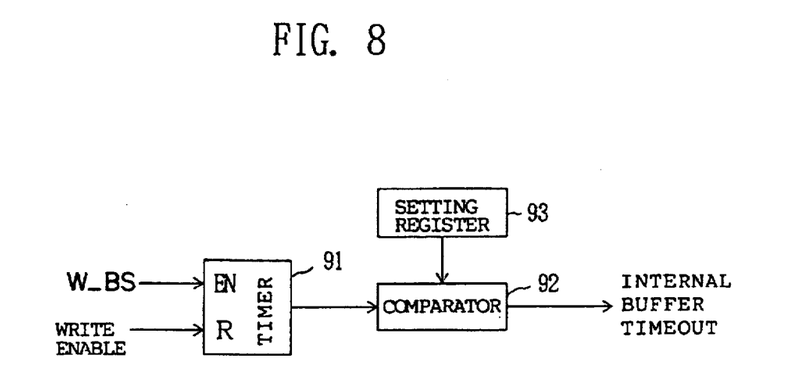
FIG. 8 is a circuit diagram of an internal buffer timer shown in FIG. 3.

Referring to FIG. 8, a timer 91 of the internal buffer timer 44 starts to perform a count operation when the signal W_BS from the internal buffer controller 42 switches to "1", and is reset each time the processing unit 15 writes data into the RAM 33, that is, each time the write enable signal switches to "1". The count value of the timer 91 is compared with a value (between a few microseconds and tens of microseconds) set in a setting register 93 by a comparator 92. When the count value of the timer 91 exceeds the value set in the register 93, the comparator 92 generates an internal buffer timeout signal, which is applied to the internal buffer control unit 42 (FIG. 3).

Figure 9:
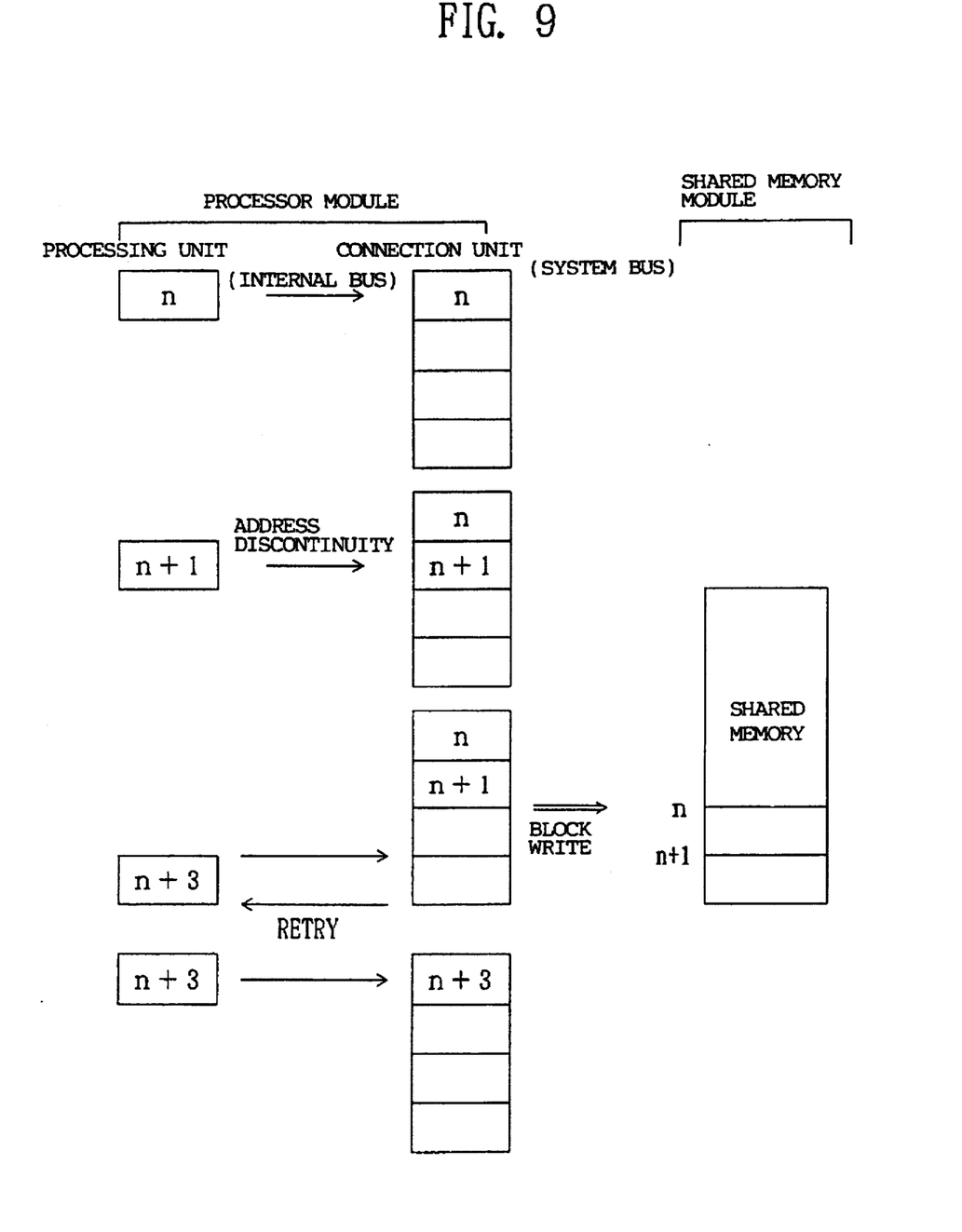
FIG. 9 is a diagram of the operation of the embodiment of the present invention.

Referring to FIG. 9, when the processing unit 15 (FIGS. 1 and 2A) requests to write data consisting of a predetermined number of bytes into an area of the shared memory 20 (FIGS. 1 and 2) indicated by an address n in the state in which the internal buffer (RAM) 33 (FIG. 3) is in the state A, the data is written into the internal buffer 33 of the processing unit 17. Next, data consisting of the predetermined number of bytes with respect to an area of the shared memory 20, indicated by an address n+1 is written into the RAM 33. Next, when data consisting of the predetermined number of bytes with respect to an area of the shared memory 20 indicated by an address n+3, the address continuity decision circuit 36 switches the access address discontinuity signal to "1". Thereby, the data related to the address n and the address n+1 are read from the RAM 33 and are output to the system bus 10. Then, the data are written into the shared memory 20 (block write).

Thereafter, the data with respect to the address n+3 is written into the RAM 33 of the connection unit 17 by the retry process by means of the processing unit 15.

In the case where the output of addresses of write data from the processing unit 15 to be written into the shared memory 20 is continuous, the write data is written into the internal buffer (RAM) 33 until the internal buffer 33 becomes full. When the internal buffer 33 becomes full, the block write is carried out from the RAM 33 to the shared memory 20.

In the above-mentioned manner, the block write is performed when the continuity of the write address to the shared memory 20, issued by the processing unit 15, disappears further, the block write is performed in the connection unit 17, so that software of the processing unit 15 is no longer needed to issue any kick-off instruction.

When the block write from the processing unit 15 to the shared memory 20 is carried out and the internal buffer (RAM) 33 becomes full, the block write is carried out in the connection unit 15, so that software of the processing unit 15 is no longer needed to issue any kick-off instruction. As a result, the overhead of the processing unit 15 can be reduced.

Figure 10:
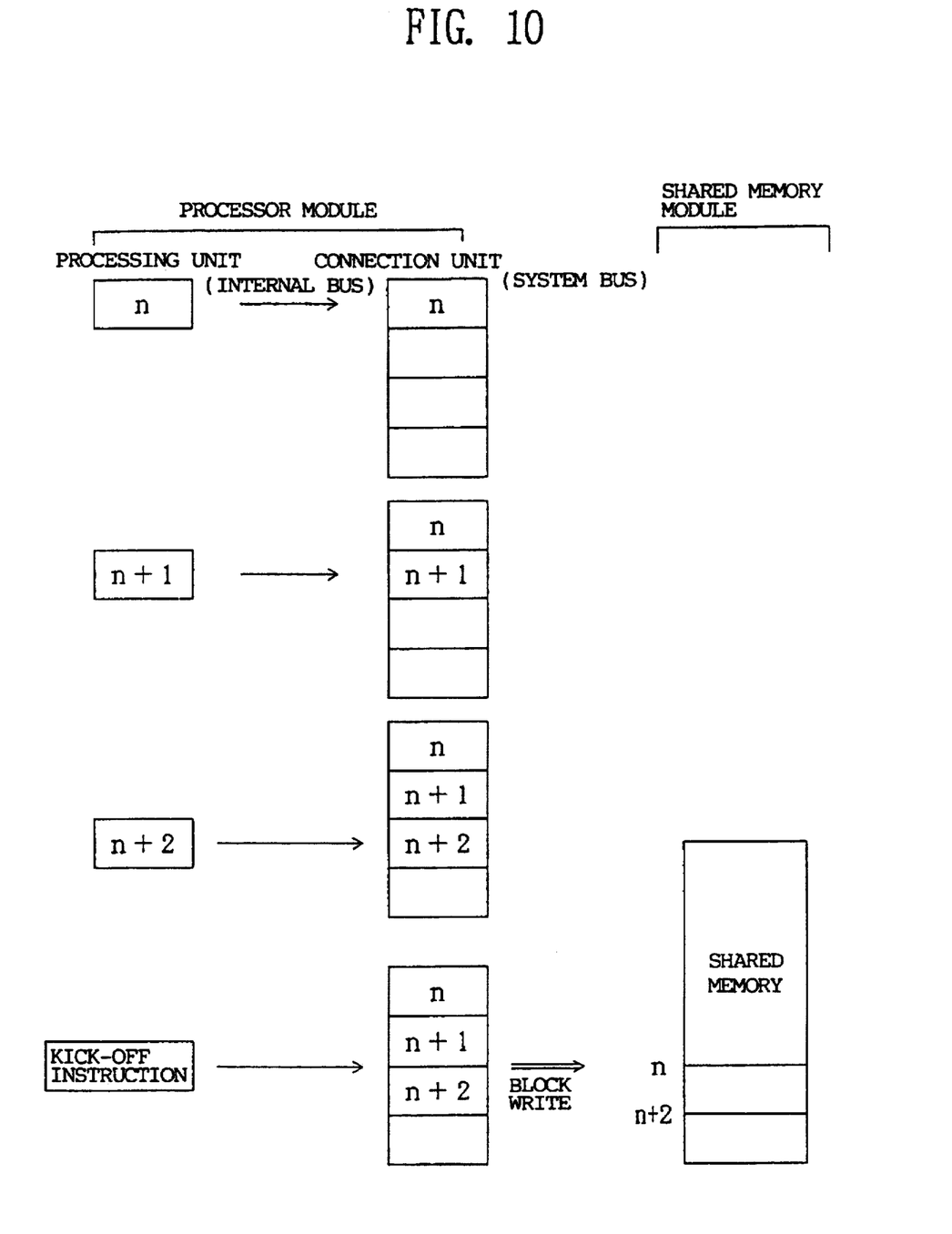
FIG. 10 is a diagram of the operation of the embodiment of the present invention.

As shown in FIG. 10, when a kick-off instruction is generated by the connection unit 17 in a state in which data supplied from the processing unit 15 and addressed to areas of addresses n, n+1 and n+2 of the shared memory 20 in the connection unit 17 have been written therein, the block writing operation is carried out so that the data related to the addresses n, n+1 and n+2 are read from the internal buffer 33 and are written into the shared memory 20.

As shown in FIG. 10, when an access other than the write access, for example, a read operation on the shared memory 20 is instructed by the connection unit 17 in the state in which data supplied from the processing unit 15 and addressed to areas of addresses n, n+1 and n+2 of the shared memory 20 in the connection unit 17 have been written therein, the block writing operation is carried out so that the data related to the addresses n, n+1 and n+2 are written into the shared memory 20. Similarly, when the internal buffer timer 44 generates the timeout signal of "1" in the state in which data supplied from the processing unit 15 and addressed to areas of addresses n, n+1 and n+2 of the shared memory 20 in the connection unit 17 have been written therein, the block writing operation is performed so that the data related to the addresses n, n+1 and n+2 are written into the shared memory 20.

In short, when an instruction other than the data write instruction using the connection unit 17, for example, a read operation on the shared memory 20 after data from the processing unit 15 is written into the shared memory 20, the block write is performed in the connection unit 17, so that software of the processing unit 15 is no longer needed to issue any kick-off instruction. Further, when the interval of subsequent write operations from the processing unit 15 to the shared memory 20 exceeds a predetermined time, the block write is carried out in the connection unit 17, so that software of the processing unit 15 is no longer needed to issue any kick-off instruction. As a result, it becomes possible to prevent the contents of the shared memory 20 from mismatching between processor modules.

According to the present invention, the block write is performed without a kick-off instruction from the central processing unit, so that the overhead of the central processing unit can be reduced and it becomes possible to prevent the contents of the shared memory 20 from mismatching between processor modules.

The present invention is not limited to the specifically disclosed embodiments, and variations and modifications may be made without departing from the scope of the present invention.

What is claimed is:

1. An asynchronous access system for a multiprocessor system having a plurality of processor modules connected to a system bus and at least one shared memory module connected to the system bus, each of the processor modules comprising a processor unit and an internal buffer associated with the processor unit, the processor unit issuing access requests to the shared memory module, including write access requests, and writing data into the associated internal buffer, data written into the associated internal buffer being read from the associated internal buffer and written into the shared memory module at a respective memory module address via the system bus, each processor module of said asynchronous access system comprising:

a detector detecting a first predetermined situation, regarding successive data write access requests from the processor module to the shared memory module for storing data at respective write addresses of the shared memory module, as to whether or not the respective, write addresses of the shared memory module for the data of the successive write access requests are continuous; and a controller causing the data stored in the associated internal buffer to be written into the shared memory module, automatically and without any instruction from the processor module, when the detector detects, as the first predetermined situation, that the respective, successive write addresses, of a current write access request and a next preceding write access request, are not continuous.

2. The asynchronous access system as claimed in claim 1, wherein:

the detector detects, as a second predetermined situation, whether or not an access request generated by the processor module to the shared memory module is other than a write access request; and said controller causes the data, stored in the respectively associated internal buffer, to be written into the shared memory module when the detector detects, as the second predetermined situation, that a current access request is other than a write access request.

3. The asynchronous access system as claimed in claim 1, wherein:

said detector detects, as a second predetermined condition, whether or not a time interval, between successive write access requests generated by the processor module, exceeds a predetermined period of time; and said controller causes the data stored in the respectively associated internal buffer to be written into the shared memory module when the detector detects that said interval, between a current write access request and a next preceding write access request, exceeds the predetermined period of time.

4. The asynchronous access system as claimed in claim 3, wherein the detector further comprises a timer measuring a predetermined period of time, equal to said time interval, starting from an end of each write access request.

5. The asynchronous access system as claimed in claim 1, wherein data from the processor module is written into the shared memory module via the system bus in a unit equal to one block of data having a predetermined number of words.

6. A processor module, comprising one of plural processor modules connected to a system bus of a multiprocessor system further having at least one shared memory module connected to the system bus, the processor module including a processor unit and an internal buffer associated with the processor unit, the processor unit issuing access requests, including write access requests, to the shared memory module and writing data into the associated internal buffer, data, written into the associated internal buffer, being read from the associated internal buffer and written into the shared memory module at a respective memory module address via the system bus, said processor module comprising:

a detector detecting a first predetermined situation, regarding successive data write access requests from the processor module to the shared memory module for storing data at respective write addresses of the shared memory module, as to whether or not the respective, write addresses of the shared memory module for the successive data write access requests are continuous; and a controller causing the data stored in the associated internal buffer to be written into the shared memory module, automatically and without any instruction from the processor module, when the detector detects, as the first predetermined situation, that the respective, successive write addresses, of a current data write access request and a next preceding write access request, are not continuous.

7. The processor module as claimed in claim 6, wherein:

the detector detects, as a second predetermined situation, whether or not an access request generated by the processor module is other than a write access request; and said controller causes the data stored in the respectively associated internal buffer to be written into the shared memory module when the detector detects as the second predetermined situation, that a current access request is other than a write access request.

8. The processor module as claimed in claim 6, wherein:

said detector detects, as a second predetermined condition, whether or not a time interval, between successive write access requests generated by the processor module, exceeds a predetermined period of time; and said controller causes the data stored in the respectively associated internal buffer to be written into the shared memory module when the detector detects that said time interval, between a current write request and a next preceding write access request, exceeds the predetermined time.

9. The processor module as claimed in claim 8, wherein said detector further comprises a timer measuring a predetermined period of time, equal to said time interval, starting from an end of each write access request.

10. The processor module as claimed in claim 6, wherein data from the processor is written into the shared memory module in a unit equal to one block of data having a predetermined number of words.

11. An asynchronous access system for a multiprocessor system having a plurality of processor modules connected to a system bus and a shared memory module connected to the system bus, each processor module issuing requests for access to the shared memory module, the requests including a write access request, to write data of a predetermined number of bits into an area of the shared memory indicated by a respective write address of the shared memory module, and a request for access to the shared memory for other than writing data therein and comprising:

a processor unit and an internal buffer associated with the processor unit wherein, in each of successive steps, the processor unit writes data of the predetermined number of bits and having a respective write address of the shared memory module, into the associated internal buffer for temporary storage therein;

a detector detecting a discontinuity, between respective write addresses of the shared memory module of a current write access request and of a next preceding write access request, and issuing a corresponding detection output; and a controller responding to a detection output of the detector for a current access request of the processor module and causing the data stored in the internal buffer associated with the processor unit to be output over the system bus and written as a block into the area of the shared memory module indicated by the respective write address thereof, automatically and without any instruction from the processor module.

12. The processor module as claimed in claim 11, wherein:

the detector detects, as a second predetermined situation, whether or not an access request generated by the processor module is other than a write access request; and said controller causes the data stored in the respectively associated internal buffer to be written into the shared memory module when the detector detects, as the second predetermined situation, that a current access request is other than a write access request.

13. The processor module as claimed in claim 11, wherein;

said detector detects, as a second predetermined condition, whether or not a time interval, between successive write access requests generated by the processor module, exceeds a predetermined period of time; and said controller causes the data stored in the respectively associated internal buffer to be written into the shared memory module when the detector detects that said time interval, between a current write request and a next preceding write access request, exceeds the predetermined time.

14. An asynchronous access system for a multiprocessor system having a plurality of processor modules connected to a system bus and a shared memory module connected to the system bus, each processor module issuing requests for access to the shared memory module, the requests including access requests to the shared memory module to write data of a predetermined number of bits into an area of the shared memory module indicated by a respective write address of the shared memory module and requests for access to the shared memory module for other than writing data therein and comprising:

a processor unit and an internal buffer associated with the processor unit, the processor unit writing data of the predetermined number of bits into the respectively associated internal buffer for temporary storage therein, the temporarily stored data to be read from the respectively associated internal buffer and written as a block over the system bus into the shared memory module at a respective write address thereof;

a detector detecting at least one of plural predetermined conditions and producing a corresponding detection output for each predetermined condition detected thereby, the predetermined conditions comprising:

(1) a first condition of the occurrence of a write access request, from the processor module to the shared memory module, concurrently with a full condition of the internal buffer, (2) a second condition of a discontinuity between successive write addresses of the shared memory module for respective data of successive write access requests from the processor unit to the shared memory module, as between a current write access request and a next preceding write access request of the successive write access requests, (3) a third condition of an interval between successive write access requests from the processor unit to the shared memory module exceeding a predetermined time duration, and (4) a fourth condition of an access request from the processor unit to the shared memory module which is other than for writing data in the shared memory module; and a controller responding to a detection output of the detector for a current access request of the processor module and causing the data stored in the internal buffer associated with the processor unit to be output over the system bus and written as a block into the area of the shared memory module indicated by the respective write address thereof, automatically and without any instruction from the processor module.

15. An asynchronous access system as recited in claim 14, wherein:

the detector detects each of the first through fourth conditions and produces respective, corresponding detection outputs; and the controller is responsive to each of the corresponding detection outputs for causing the data stored in the internal buffer respectively associated with the processor unit to be output over the system bus and written as a block into the area of the shared memory module indicated by the respective write address therein, automatically and without any instruction from the processor module.

* * * * *